May 2, 1967

L. W. DUCOTE 3,317,716

HIGH SPEED REVERSING COUNTER

Filed July 22, 1963

NUMERICAL COUNT LEVEL OF ACCUMULATOR

EXTERNAL MODE CONTROL

OPERATING MODE OF GATED TRANSMISSION CIRCUIT

ADD ADJUSTMENT PULSE

SUBTRACT ADJUSTMENT PULSE

TRANSMITTED ADD ADJUSTMENT PULSE

TRANSMITTED SUBTRACT ADJUSTMENT PULSE

INVENTOR.
LOUIS W. DUCOTE

BY

ATTORNEY

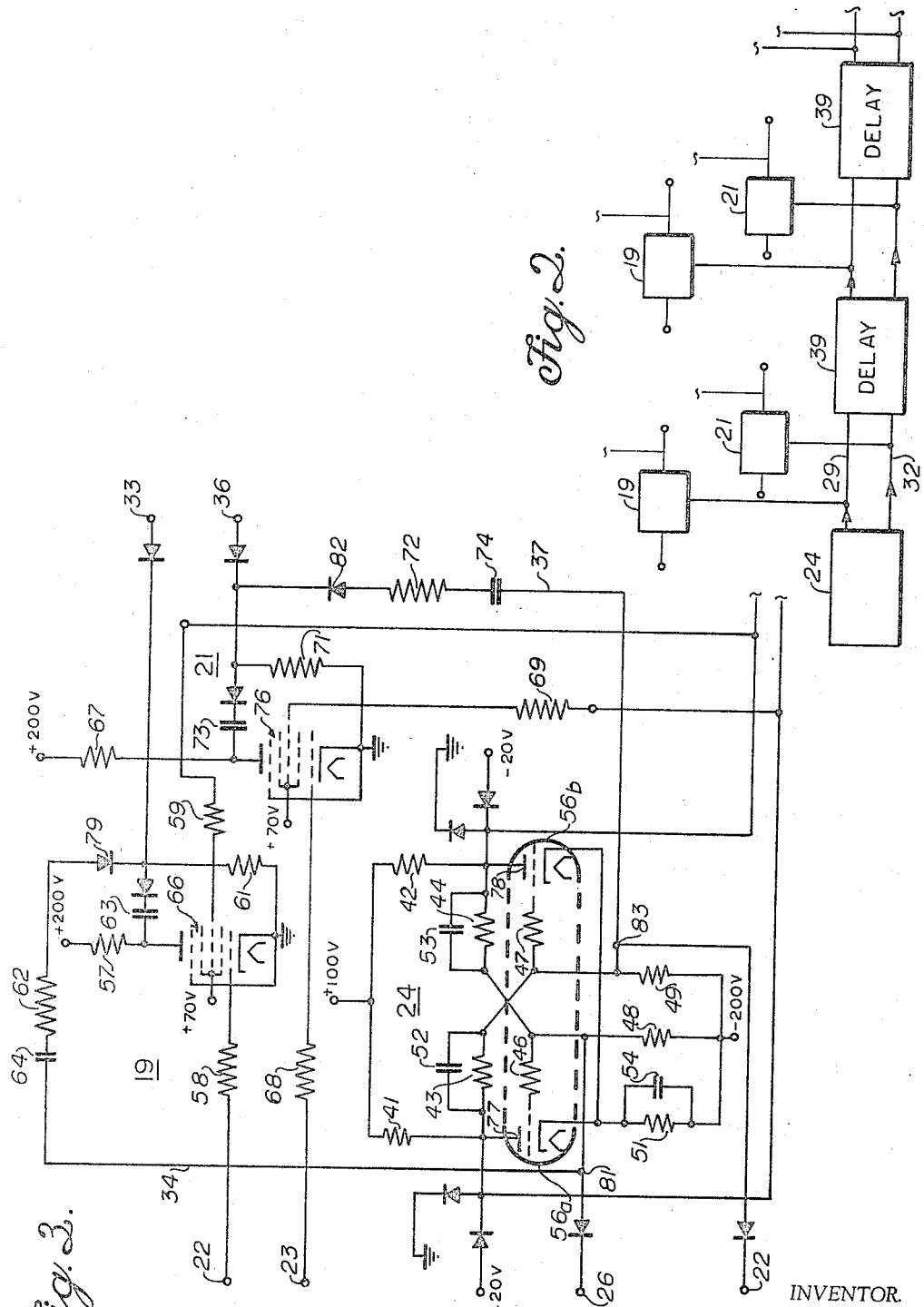

United States Patent Office 3,317,716
Patented May 2, 1967

3,317,716
HIGH SPEED REVERSING COUNTER
Louis W. Ducote, Castro Valley, Calif., assignor to the United States of America as represented by the United States Atomic Energy Commission
Filed July 22, 1963, Ser. No. 296,877
4 Claims. (Cl. 235—92)

The invention described herein was made in the course of, or under, Contract No. W-7405-ENG-48 with the United States Atomic Energy Commission.

The present invention relates in general to summation counters designed to count a series of electrical pulses in either an add or subtract counting mode. More particularly, it appertains to an improved method and apparatus for achieving the same.

Electronic counters are employed for a variety of purposes in electronics and various related fields. For many such purposes, it is advantageous for counters to have a reversing feature, i.e., able to selectively count in either an add or subtract counting mode and provide the algebraic sum of the total count. For example, in various applications of digital measuring and indicating techniques it is necessary to observe a series of small electrical pulses embedded in a large noise background. Under such conditions, the pulses can be counted by an algebraic summation process wherein the noise background count is compared to the pulse plus noise background count to arrive at the number of signal pulses embedded in the noise. Electronic counters with a reversing feature perform such measurements by first counting the pulses plus noise background in the add mode for an interval of time. Then, the counting mode of the counter is reversed to the subtract mode and the noise background in the absence of the signal pulses is counted for the same interval of time whereby the noise background count is subtracted from the pulse plus noise background count to arrive at a count representative of the average number of signal pulses embedded in the noise.

While many of the present day electronic reversing counters are able to count at very high rates (e.g., 200 kc.) in either the add or subtract counting mode, such counters have one notable disadvantage. In order to prevent an erroneous count, the counting mode can not be changed after the counter has received an input pulse until a predetermined time interval (dead time) has passed. The time interval is required to insure that a count representative of an input pulse preceding the mode reversal signal has sufficient time to be transmitted to all the accumulators. The duration of the time interval is essentially a function of the type of accumulator utilized and the decade range of the instrument.

In cases where it is necessary to obtain a difference measurement between a varying function and a reference which varies, e.g., a fluctuating noise background, the measuring time interval (add time, dead time and subtract time) must be short enough so that the reference is substantially constant during the interval. By undertaking a series of such interval measurements and accumulating the results, an accurate difference measurement over an extended period of time can be obtained. However, the characteristic dead time of conventional reversing counters limits the minimum measuring time interval. Thus, in cases where the reference varies substantially within a very short interval of time, conventional reversing counters are inadequate. Furthermore, the greater the counting range of such counters, the more pronounced the limitation becomes.

Considerable advantage is therefore to be gained by the provision of a reversible counting method and means wherein the requirement of a time interval (dead time) between an input signal and counting mode reversal is eliminated. The elimination of the dead time requirement results in a reversing counter whose counting rate is limited only by the rate at which the first accumulator can accumulate counts. Furthermore, such a reversing counter is considerably more flexible than conventional reversing counters since the counting range of the counter can be extended without affecting the effective counting rate, i.e., the maximum rate at which counts can be accumulated while the counter experiences a counting mode transition.

The present invention provides a method and apparatus which accomplish the foregoing and thereby overcomes many of the limitations of the conventional electronic reversing counters. More particularly, in the pulse counting method of the invention a series of electrical pulses are directed to a first of a series of cascaded accumulators, for example, glow transfer digital display tubes each with associated means for selectively driving it in an add or subtract mode. Provision is thus made for counting the pulses therein in a preselected counting mode including either addition or subtraction. At first and second preselected count levels registered by the first accumulator, subtract and add adjustment pulses are generated, respectively. The adjustment pulses are directed to a gated transmission circuit. Such a gated circuit would be, for example, two parallel gated transmission paths wherein the add adjustment pulse is directed to one of the paths and the subtract adjustment pulse is directed to the other.

A gating pulse is generated in response to the direction of accumulation of counts in the first accumulator and is selectively directed to one of the paths. This gating pulse gates the paths to allow the adjustment pulse corresponding to the direction of accumulation of counts in the first accumulator to pass to a second accumulator. Thus, by utilizing the direction of accumulation of counts in the first accumulator to set the gated transmission circuit, the gated transmission circuit is always in a condition to transmit to the second accumulator the adjustment pulse corresponding to the direction of accumulation of counts in the first accumulator. This eliminates the "dead time" inherent in the prior art reversing counters.

The invention also provides apparatus in which the foregoing method may be conducted, such apparatus comprising in general at least two cascaded accumulators arranged to count and register the successive input pulses. A first gated transmission circuit is connected between the cascaded accumulators to provide an add conduction path therebetween. A second gated transmission circuit is connected between the cascaded accumulators to provide a subtract conduction path therebetween. Circuit means responsive to the direction of accumulation of counts in the first accumulator selectively gates the transmission circuitry of the add and subtract conduction paths to the proper state to allow transmission of an adjustment pulse corresponding to the direction of accumulation of counts in the first accumulator to subsequent accumulators.

Accordingly, it is an object of the invention to provide an improved method and apparatus for electronically counting in either an add mode or subtract mode and provide the algebraic sum of the total count.

More particularly it is an object of the invention to provide such a method and apparatus wherein the effective counting rate of the counter is independent of the counting range of the counters.

Another object of the invention is to provide a reversing counter wherein the requirement for a time interval between an input pulse and reversal of counting mode is eliminated.

A further object of the invention is to provide an improved method and apparatus for counting a series of small electrical signal pulses embedded in a large noise background.

Additional objects and advantages of the invention will become apparent from the following description and claims considered together with the accompanying drawing of which:

FIGURE 3 is a schematic diagram of a particular embodiment of the apparatus of the invention.

FIGURE 4 is a graphical representation of a pulse sequence illustrating the operation of the present invention in which the horizontal lines represent concurrent time functions and the displacements of the vertical lines associated therewith depict changes in the operational signals of FIGURE 1 as a function of time.

Figure 1:
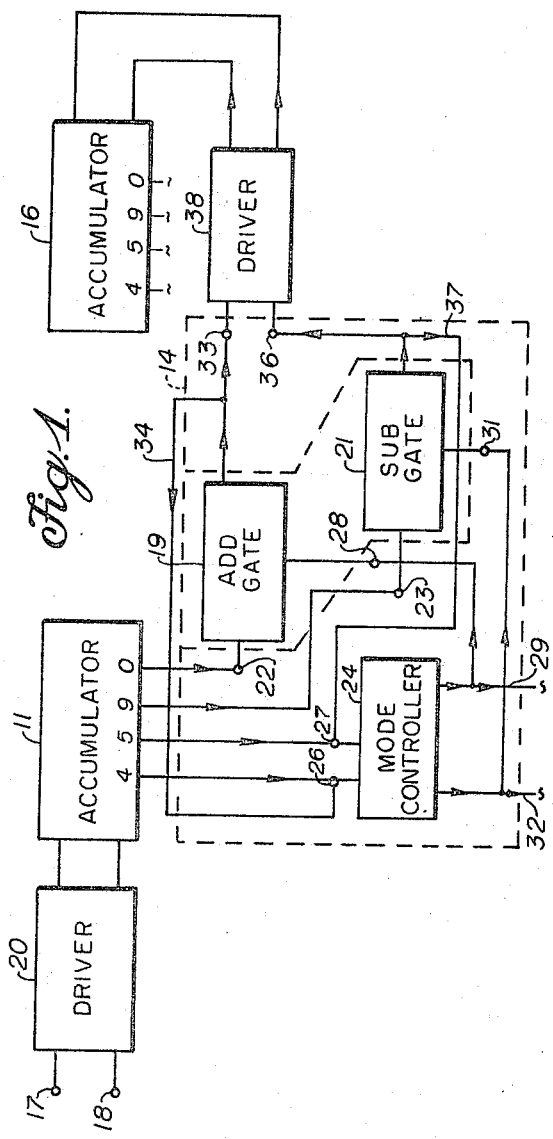
FIGURE 1 is a block diagram of the apparatus for conducting the method of the invention.

Considering now the method of the present invention with reference to FIGURES 1 and 4, a series of electrical pulses is directed to a first accumulator 11 wherein the pulses are counted and a number representative of their total is registered. This total is represented in FIGURE 4 by the row of digits opposite the legend, Numerical Count Level of Accumulator. The above-noted accumulator 11 is capable of operating in either an add or subtract counting mode controlled, for example, by an external mode control signal. FIGURE 4 illustrates the state of this external mode control (opposite the subject legend) and indicates therein a change from an add mode to a subtract mode at a count level of 2 for the first accumulator. For a better understanding of the method of the invention, it will be assumed that initially accumulator 11 is operating in the add counting mode and has a register length of ten. As can be seen by referring to Segment A of FIGURE 4, when accumulator 11 registers a count level of nine a subtract adjustment pulse 12 is generated. Similarly, when accumulator 11 registers a count level of ten (represented by zero on the scale of numerical count of accumulator in FIGURE 4), an add adjustment pusle 13 is generated. The add adjustment pulses 12 and 13 are directed to a gated transmission circuit 14 which selectively allows one of the adjustment pulses to pass therethrough to a second accumulator 16. Accumulator 16 counts and registers a number representative of the algebraic summation of the adjustment pulses received from accumulator 11.

The selective transmission of adjustment pulses is accomplished by gating transmission circuit 14 to allow passage of the add adjustment pulse when accumulator 11 is accumulating counts in the add counting mode and gating transmission circuit 14 to allow passage of the subtract adjustment pulse when accumulator 11 is accumulating counts in the subtract counting mode. To set transmission circuit 14 in the proper state to allow the transmission of the correct adjustment pulse to accumulator 16, a gate signal is generated in response to the direction of accumulation of counts in accumulator 11. This gate signal gates transmission circuit 14 to allow the the transmission to accumulator 16 of the adjustment pulse corresponding to the direction of accumulation of counts in accumulator 11. With particular reference to Segment B of FIGURE 4, when the numerical count of accumulator 11 attains the level of four, transmission circuit 14 is set to transmit a subtract adjustment pulse 13, and when accumulator 11 attains the level of five, transmission circuit 14 is set to transmit an add adjustment pulse 12. Consequently as accumulator 11 accumulates counts in the add counting mode, transmission circuit 14 will be set to transmit the subsequently generated add adjustment pulse 13 while preventing the transmission of the generated subtract adjustment pulse 12. This particular counting sequence is illustrated in Segment C of FIGURE 4, in which the numerical count level of the accumulator 11 increases from 1 to 10 (or 0) and the operating mode of the gated transmission circuit is shown to be in the add mode as the count proceeds through 9 to 10. Accordingly, the add adjustment pulse 13 is transmitted while the subtract adjustment pulse 12 is blocked. Conversely as illustrated in Segment D of FIGURE 4, as accumulator 11 accumulates counts in the subtract counting mode, transmission circuit 14 will be set to transmit only the subtract adjustment pulse 12. Additionally, to eliminate the necessity of waiting at least four counts after an adjustment pulse has been transmitted before the counting mode of accumulator 11 can be reversed, each time an adjustment pulse is transmitted, e.g., add adjustment pulse 13, the operating mode of the gated transmission circuit is changed, e.g., from add to subtract. Thus, as illustrated in Segment E of FIGURE 4, gated transmission circuit is readied to transmit an adjustment pulse corresponding to a direction of accumulation of counts opposite to that of the previously transmitted adjustment pulse without having to wait until the numerical count of accumulator 11 passes through register levels four and five.

In cases where the method of the present invention is utilized to count pulse signals embedded in a high noise background it is advantageous to count in the add and subtract counting modes for equal time intervals. In the add counting mode, the signal plus noise will be counted while in the subtract counting mode, only noise will be counted whereby the algebraic sum of the total count is obtained.

Apparatus for conducting the foregoing method of the present invention is illustrated in FIGURE 1 wherein at least two cascaded accumulators, 11 and 16 respectively, having, for example, a register length of ten, are arranged to count and register the number of input pulses present at input terminal 17 in either an add or subtract counting mode. The counting mode of accumulator 11 is controlled by the external mode control signal introduced at terminal 18 of accumulator 11. Glow transfer digital display tubes may be utilized as the accumulators. In such an arrangement, each pulse to be counted is first directed to driver 20, e.g., as disclosed in the application of Louis W. Ducote, assigned to the U.S. Atomic Energy Commission, entitled, Integrator for Staggered Pulses, Ser. No. 281,376, filed May 17, 1963, now Patent No. 3,270,-287, wherein it is converted to a phase-shifted pair of pulses. These pulses are directed simultaneously to each pair of guide grids that are interposed the serially arranged digits of the display tube to change the position of the glow therein. The direction of accumulation of counts, i.e., the counting mode, will depend upon the sequence of application of the phase-shifted pulses to the guide grids which, in the case of accumulator 11, is controlled by the external mode control signal.

More specifically, the apparatus of the invention comprises a gated transmission circuit 14, including an add gate circuit 19 and subtract gate circuit 21. A first input terminal 22 of add gate 19 is electrically connected to accumulator 11 to receive an add adjustment pulse generated therein when the count level of accumulator 11 registers ten. A first input terminal 23 of subtract gate 21 is electrically connected to accumulator 11 to receive a subtract adjustment pulse generated therein when the count level of accumulator 11 registers nine.

However, as accumulator 11 scales from one to ten (or vice versa) in response to a series of input signals present at input terminal 18, both add and subtract adjustment pulses are generated. To insure the transmission of the correct adjustment pulse, a mode controller 24, for example, a bistable multivibrator, responsive to the direction of accumulation of counts in accumulator 11, selectively gates transmission circuit 14 to the proper state to allow the transmission of an adjustment pulse corresponding to the direction of accumulation of counts in accumulator 11 to subsequent accumulators. A first input terminal 26 of mode controller 24 is electrically connected to accumulator 11 to receive a pulse signal generated therein when the count level of accumulator 11 registers four. This pulse signal switches mode controller 24 to the subtract conducting mode. A second input terminal 27 of mode controller 24 is electrically connected to accumulator 11 to receive a pulse signal when the count level of accumulator 11 registers five. This pulse signal switches mode controller 24 to the add conducting mode.

A second input terminal 28 of add gate 19 is electrically connected to one output terminal of mode controller 24 at an add buss 29 and receives a gate pulse therefrom to allow transmission of the add adjustment pulse from accumulator 11 to accumulator 16 when mode controller 24 is in the add conducting mode.

A second input terminal 31 of subtract gate 21 is electrically connected to the other output terminal of mode controller 24 at a subtract buss 32 and receives a gate pulse therefrom to allow transmission of the subtract adjustment pulse from accumulator 11 to accumulator 16 when mode controller 24 is in the subtract conducting mode.

An output terminal 33 of add gate 19 is electrically connected through lead 34 to input terminal 26 of mode controller 24 to the subtract conducting mode when an add adjustment pulse is transmitted to accumulator 16.

Correspondingly, an output terminal 36 of subtract gate 21 is electrically connected through lead 37 to input terminal 27 of mode controller 24 to switch mode controller 24 to the add conducting mode when a subtract adjustment pulse is transmitted to accumulator 16.

Output terminals 33 and 36 of add and subtract gates 19 and 21 respectively are connected to a driver 38 for the second accumulator 16.

It is to be noted that additional accumulators (not shown) may be cascaded to increase the decade range of the counter. By utilizing separate mode controllers, add gate circuits and subtract gate circuits of the types described interposed successive accumulators, the operating mode of each transmission circuit (add gate and subtract gate circuits) is independent of the others.

Figure 2:
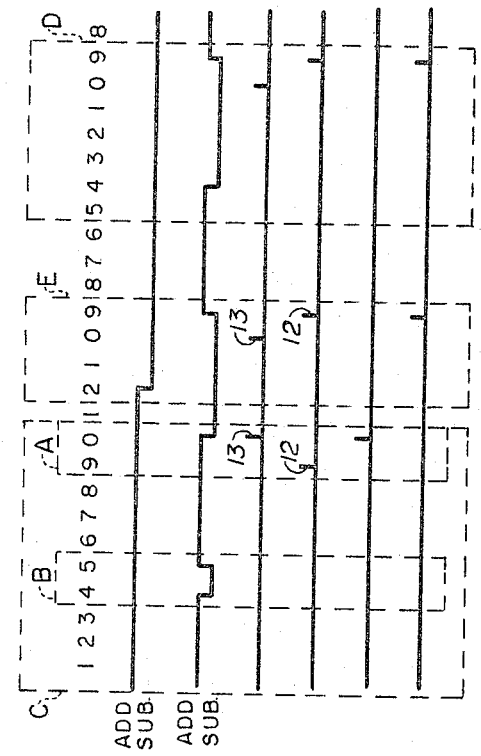
FIGURE 2 is a partial block diagram of the apparatus illustrating the use of time delay units to control the counting mode of the cascaded accumulators.

Additionally, with reference to FIGURE 2, it is shown that by utilizing time delay techniques the operating mode of the add and subtract gate circuits interposed successive cascaded accumulators may be all controlled by the mode controller 24 interposed only the first two cascaded accumulators, 11 and 16. A time delay means 39 is electrically interposed add and subtract busses 29 and 32, and each add and subtract gate circuit interposed the cascaded accumulators following accumulator 16. The duration of the time delay of each time delay means 39 is equal to the time required to transmit an adjustment pulse from one accumulator to a succeeding one plus the time required to register the count of the adjustment pulse in the preceding accumulator.

With reference to FIGURE 3, there is shown a detailed circuit diagram of an embodiment of the gated transmission circuit 14 and mode controller 24. The following is a list of the circuit parameters of an embodiment of the invention actually constructed.

(1) Mode Controller 24 (bistable multivibrator):

| | | |
|---|---|---|
| Resistors 41, 42 | kilohms | 39 |
| Resistors 43, 44 | do | 360 |
| Resistors 46, 47 | ohms | 100 |
| Resistors 48, 49 | kilohms | 240 |
| Resistor 51 | do | 15 |
| Capacitors 52, 53 | pf | 100 |
| Capacitor 54 | pf | 4700 |
| Vacuum Tube 56 | | 5964 |
| All diodes | | 1N39A |

(2) Add Gate Circuit 19:

| | | |
|---|---|---|
| Resistor 57 | kilohms | 82 |
| Resistors 58, 59 | do | 100 |
| Resistor 61 | do | 68 |
| Resistor 62 | do | 51 |
| Capacitor 63 | pf | 250 |
| Capacitor 64 | pf | 50 |
| Vacuum tube 66 | | 5915 |
| All diodes | | 1N39A |

(3) Subtract Gate Circuit 21:

| | | |
|---|---|---|
| Resistor 67 | kilohms | 82 |
| Resistors 68, 69 | do | 100 |
| Resistor 71 | do | 68 |
| Resistor 72 | do | 51 |
| Capacitor 73 | pf | 250 |
| Capacitor 74 | pf | 50 |
| Vacuum tube 76 | | 5915 |
| All diodes | | 1N39A |

Add gate input terminal 22 and subtract gate terminal 23 were electrically connected to a glow transfer digital display tube (not shown) to receive add and subtract adjustment pulses, respectively, when the tube registered ten and nine. Mode controller input terminals 26 and 27 were also electrically connected to the display tube to respectively receive a negative pulse signal when the tube registered four and five. The driver (not shown) of a second glow transfer digital display tube was electrically connected to output terminal 33 of add gate circuit 19 and output terminal 36 of subtract gate circuit 21 to receive the add and subtract adjustment pulses passed by the gate circuits.

Upon operation, this circuit's performance was highly satisfactory. The display tubes are capable of counting a 100 kc. signal. Such a signal embedded in random noise was fed into the first display tube and it was found that mode reversal could be accomplished without the loss of information associated with the conventional "dead time" reversing counters.

While the present invention has been hereinbefore described in terms of specific steps in the method and with respect to a single basic embodiment, it will be apparent that numerous modifications and variations are possible within the spirit and scope of the invention and thus it is not intended to limit the invention except by the terms of the following claims.

What is claimed is:

1. A high speed reversing summation counter comprising,
    (1) at least two cascaded decade accumulators arranged to count and register successive input pulses,
    (2) an add gate electrically connected to the first of said cascaded accumulators to receive an add adjustment pulse therefrom, said adjustment pulse generated when said first accumulator registers a numerical count level of ten,
    (3) a subtract gate electrically connected to said first accumulator to receive a subtract adjustment pulse therefrom, said adjustment pulse generated when said first accumulator registers a numerical count level of nine, and
    (4) a bistable multivibrator, said multivibrator electrically connected to said first accumulator to receive first and second mode control pulse therefrom when said first accumulator registers numerical count levels of four and five respectively, said multivibrator electrically connected to said add gate to receive a third mode control pulse therefrom when an add adjustment pulse is transmitted through said add gate, said multivibrator electrically connected to said subtract gate to receive a fourth mode control pulse therefrom when a subtract adjustment pulse is transmitted through said subtract gate, said multivibrator responding selectively to the first and third mode control pulses by gating said subtract gate to allow transmission of said subtract adjustment pulse, and said multivibrator responding selectively to the second and fourth mode control pulses by gating said add gate to allow transmission of said add adjustment pulse.

2. A high speed reversing summation counter, comprising:
(1) at least three cascaded decade accumulators arranged to count and register successive input pulses in both an add and subtract mode;
(2) gated transmission paths electrically connected between said accumulators to provide conduction paths therebetween, each of said gated transmission paths arranged to receive a subtract adjustment pulse when the preceding accumulator associated therewith registers a first preselected count level, and an add adjustment pulse when the preceding accumulator associated therewith registers a second preselected count level;
(3) bistable multivibrator means for gating said transmission gates responsive to the direction of accumulation of counts in the first of said accumulators and productive of electrical signals for gating said transmission gates to allow transmission of the add adjustment pulse therethrough when said first accumulator is in the add counting mode and for gating said transmission paths to allow transmission of the subtract adjustment pulse therethrough when said first accumulator is in the subtract counting mode;
(4) circuit means for switching said multivibrator means to allow transmission of an add adjustment pulse in response to the transmission of a subtract adjustment pulse to the second of said accumulators and to provide for the transmission of an add adjustment pulse to the second accumulator, said circuit switching means electrically communicating the outputs of those transmission paths which are connected between the first and second of said accumulators with said multivibrator means;
(5) circuit means for delaying said gating signals interposed between the second and third and each subsequent pair of said accumulators, the time delay associated with each of said delay means being equal to the sum of the time required to transmit an adjustment pulse to the accumulator receiving the adjustment pulse from the gating transmission circuit in response to an input signal pulse plus the time required to register the count of the adjustment pulse in the preceding accumulator.

3. A high speed reversing summation counter as recited in claim 2, further defined by said first and second preselected count levels being respectively 9 and 10.

4. A high speed reversing summation counter as recited in claim 2, further defined by said multivibrator means being responsive to count levels of the first accumulator other than said preselected count levels.

References Cited by the Examiner

UNITED STATES PATENTS 2,964,241  12/1960  Rosenberg et al. _____ 235—92

FOREIGN PATENTS 850,715  10/1960  Great Britain.

MAYNARD R. WILBUR, *Primary Examiner.*

JOHN F. MILLER, G. J. MAIER, *Assistant Examiners.*